United States Patent
Fanini et al.

(10) Patent No.: US 7,598,741 B2
(45) Date of Patent: *Oct. 6, 2009

(54) METHOD AND APPARATUS FOR INTERNAL CALIBRATION IN INDUCTION LOGGING INSTRUMENTS

(75) Inventors: Otto N. Fanini, Houston, TX (US); Stanislav W. Forgang, Houston, TX (US); Michael S. Crosskno, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,271

(22) Filed: Mar. 13, 2007

(65) Prior Publication Data
US 2007/0205770 A1 Sep. 6, 2007

Related U.S. Application Data (60) Continuation-in-part of application No. 10/867,620, filed on Jun. 15, 2004, now Pat. No. 7,190,169, which is a continuation-in-part of application No. 10/841,397, filed on May 7, 2004, now Pat. No. 7,199,586, which is a division of application No. 10/262,548, filed on Oct. 1, 2002, now Pat. No. 6,734,675, which is a division of application No. 09/471,289, filed on Dec. 24, 1999, now Pat. No. 6,586,939.

(51) Int. Cl.
*G01V 3/18* (2006.01)
*G01V 3/28* (2006.01)
(52) U.S. Cl. .............................. 324/339; 324/334
(58) Field of Classification Search ......... 324/338–343, 324/334
See application file for complete search history.

(56) References Cited

U.S. PATENT DOCUMENTS

| | | | |
|---|---|---|---|
| 3,093,658 | A | 6/1963 | Pappo |
| 3,094,658 | A | 6/1963 | Bravenec et al. |
| 3,996,518 | A | 12/1976 | Halstead et al. |
| 4,302,722 | A | 11/1981 | Gianzero |
| 4,367,647 | A | 1/1983 | Barnoud et al. |
| 4,416,494 | A | 11/1983 | Watkins et al. |

(Continued)

FOREIGN PATENT DOCUMENTS

EP 0289418 B1 11/1988

(Continued)

OTHER PUBLICATIONS

J.H. Moran et al.; "Basic Theory of Induction Logging and Application to Study of Two-Coil Sondes," Geophysics, vol. 27, No. 6, Part 1, Dec. 1962, Society of Exploration Geophysicists, pp. 829-858.

(Continued)

*Primary Examiner*—Reena Aurora
(74) *Attorney, Agent, or Firm*—Madan & Sriram, P.C.

(57) ABSTRACT

The present invention improves measurement of the formation induction response in the presence of the primary magnetic field generated by a logging tool's transmitter. A structure is provided having a new combination of electrical and mechanical design features which provide logging tool for internal calibration and checking of antenna performance and characteristics before during and after well logging operations.

13 Claims, 7 Drawing Sheets

U.S. PATENT DOCUMENTS

| | | |
|---|---|---|
| 4,471,436 A | 9/1984 | Schaefer et al. |
| 4,514,693 A | 4/1985 | Meador |
| 4,651,101 A | 3/1987 | Barber et al. |
| 4,808,929 A | 2/1989 | Oldigs |
| 4,837,517 A | 6/1989 | Barber |
| 4,857,852 A | 8/1989 | Kleinberg et al. |
| 5,065,099 A | 11/1991 | Sinclair et al. |
| 5,157,605 A | 10/1992 | Chandler et al. |
| 5,278,507 A * | 1/1994 | Bartel et al. ............ 324/338 |
| 5,343,001 A | 8/1994 | Cowles et al. |
| 5,452,761 A | 9/1995 | Beard et al. |
| 5,600,246 A | 2/1997 | Forgang et al. |
| 5,708,204 A | 1/1998 | Kasap |
| 5,781,436 A * | 7/1998 | Forgang et al. ............ 702/7 |
| 5,869,968 A | 2/1999 | Brooks et al. |
| 5,883,515 A | 3/1999 | Strack et al. |
| 5,999,883 A | 12/1999 | Gupta et al. |
| 5,999,884 A * | 12/1999 | Kriegshauser et al. ......... 702/7 |
| 6,064,210 A | 5/2000 | Sinclair |
| 6,150,954 A | 11/2000 | Smith |
| 6,311,045 B1 | 10/2001 | Domokos |
| 6,487,395 B1 | 11/2002 | Durec et al. |
| 6,586,939 B1 | 7/2003 | Fanini et al. |
| 6,930,652 B2 * | 8/2005 | Smith et al. ............ 343/895 |
| 7,190,169 B2 * | 3/2007 | Fanini et al. ............ 324/339 |
| 2002/0113592 A1 | 8/2002 | Omeragic |
| 2003/0004647 A1 | 1/2003 | Sinclair |
| 2003/0028324 A1 | 2/2003 | Xiao et al. |
| 2003/0055565 A1 | 3/2003 | Omeragic |
| 2003/0100994 A1 | 5/2003 | Strickland et al. |
| 2003/0107378 A1 | 6/2003 | Strickland et al. |
| 2003/0114987 A1 | 6/2003 | Edwards et al. |
| 2004/0017197 A1 | 1/2004 | Chen et al. |

FOREIGN PATENT DOCUMENTS

| | | |
|---|---|---|
| WO | WO9800733 | 1/1998 |

OTHER PUBLICATIONS

L.A. Tabarovsky et al.; Radial Characteristics of Induction Focusing Probes with Transverse Detectors in an Anisotropic Medium, Nauka, Soviet Geology and Geophysics, 20 (1979), pp. 81-90.

Wilt et al.; Electromagnetic Methods for Development and Production: state of the Art, The Leading Edge, (Apr. 1998), pp. 487-491.

Zhou et al., Reservoir Monitoring with Interwell Electromagnetic Imaging, Chevron (date: unknown), pp. 1-10.

Zhou et al.; A Review of Interwell Electromagnetic Methods for Reservoir Characterization, (date unknown), pp. 1-8.

Maher et al., The Transverse Induction Logging Tool (TILT) Provided Enhanced Evaluation Results in the Cognac Field, Gulf of Mexico, (May 1999), pp. 1-8.

* cited by examiner

METHOD AND APPARATUS FOR INTERNAL CALIBRATION IN INDUCTION LOGGING INSTRUMENTS

CROSS REFERENCES TO RELATED APPLICATIONS

This application is a continuation in part of U.S. patent application Ser. No. 10/867,620, filed Jun. 15, 2004 (now U.S. Pat. No. 7,190,169), which is a continuation in part of U.S. patent application Ser. No. 10/841,397 filed May 7, 2004 (now U.S. Pat. No. 7,199,586), which is a division of U.S. patent application Ser. No. 10/262,548 filed Oct. 1, 2002 (now U.S. Pat. No. 6,734,675) which is a division of U.S. patent application Ser. No. 09/471,289 filed Dec. 24, 1999 (now U.S. Pat. No. 6,586,939).

BACKGROUND OF THE INVENTION

1. Field of the Invention The invention is related generally to the field of electromagnetic induction resistivity well logging instruments. More specifically, the invention is related to a method and apparatus for calibration and pre- and post logging verification for an induction resistivity well logging tool operating in the frequency and/or time domain for reduced errors introduced into the acquired logging data.

2. Description of the Related Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et al and in U.S. Pat. No. 5,600,246 issued to Fanini et al.

The conventional geophysical induction resistivity well logging tool is a probe suitable for lowering into the borehole and it comprises a sensor section containing a transmitter and receiver and other, primarily electrical, equipment for measuring data to infer the physical parameters that characterize the formation. The sensor section, or mandrel, comprises induction transmitters and receivers positioned along the instrument axis, arranged in the order according to particular instrument or tool specifications and oriented parallel with the borehole axis. The electrical equipment generates an electrical voltage to be further applied to a transmitter induction coil, conditions signals coming from receiver induction coils, processes the acquired information, stores or by means of telemetry sends the data to the earth surface through a wire line cable used to lower the tool into the borehole.

There are a few hardware margins and software limitations that impact a conventional transversal induction logging tool performance and result in errors appearing in the acquired data.

The general hardware problem is typically associated with an unavoidable electrical field that is irradiated by the tool induction transmitter simultaneously with the desirable magnetic field, and it happens in agreement with Maxwell's equations for the time varying field. The transmitter electrical field interacts with remaining modules of the induction logging tool and with the formation; however, this interaction does not produce any useful information. Indeed, due to the always-existing possibility for this field to be coupled directly into the receiver part of the sensor section through parasitic displacement currents, it introduces the noise. When this coupling occurs, the electrical field develops undesirable electrical potentials at the input of the receiver signal conditioning, primarily across the induction coil receiver, and this voltage becomes an additive noise component to the signal of interest introducing a systematic error to the measurements. Fortunately, there are proven techniques allowing for suppressing of these undesirable effects that were discussed in the above-mentioned U.S. Pat. No. 6,586,939 B1.

Further improvements of induction measurements have been associated with long-time tool reliability and, in particular, with overall stability of transmitter-receiver magnetic moments as well as accounting for possible gain and phase changes while operating in wide range of well bore temperatures.

Thus, for those who are skilled in the art it could be understood that operating downhole instruments in rapidly changed environmental conditions results in changes of the tool geometries including elongation of the induction coils and even their micro-dislocation along instrument mandrel. These effects exist due to different and finite temperature expansion coefficients of the materials the tool mandrel was built from, some imperfections in tool manufacturing processes, etc. Typically, the design of downhole instrumentation targets hardware solutions where these changes are monotonic, preferably linear with the temperature and have no hysteresis, i.e., are fully reversible. Apparently, if these changes are not accounted while the acquired data is processed, it leads to significant errors in calculation of final formation resistivity values.

To enable correct processing of the acquired data the downhole tools should pass through comprehensive temperature, pressure and vibration testing during their manufacturing. The results of these tests typically form correction tables, usually unique for each instrument, that are either stored in the tool on-board firmware or in the surface processing unit.

However, having these tables is not always sufficient as it's almost impossible to predict every condition the tool could be in during transportation and operation. An ability to quickly verify the instrument parameters on-site, run fast pre- and post-logging verifications and be able to check them during measurements even while logging would further enhance measurement accuracy.

Thus, there is a need for a method and apparatus to conduct these performance verifications or calibrations so that they can be processed and accounted for in acquired data.

SUMMARY OF THE INVENTION

One embodiment of the disclosure is an apparatus for sensing antenna performance in an induction logging tool. The apparatus includes a transmitter and receiver, a magnetic field generating mechanism electromagnetically coupled to the transmitter, and a processor configured to process a signal from the receiver and sense the antenna performance. This field generating mechanism may include a bucking coil and a switch. The bucking coil may be configured to be energized by a current from the transmitter flowing through the switch. The magnetic field generating mechanism may include a reference loop magnetically coupled to the transmitter wherein, within the reference loop, currents produce a magnetic field. The magnetic field may be different in an amplitude and/or phase from a response from formation. The reference loop may include a load. The load may be a phase-shifting load. The phase shifting load may be constructed from a discrete electronic component, a transmission line, an electromagnetic field absorbing material, and/or a Faraday phase shifter. The apparatus may include a conveyance device selected from a wireline or a drilling tubular.

Another embodiment of the invention is a method of sensing antenna performance in an induction logging tool. The induction logging tool is deployed in a borehole. A transmitter magnetic field is coupled in a reference loop. A secondary magnetic field is generated in the reference loop. The secondary magnetic field is sensed in the receiver, and a signal from the receiver in response to the secondary magnetic field is processed to give an indication of antenna performance. In reference loop may be loaded with an active load. A current may be induced in a loop load network.

BRIEF DESCRIPTION OF THE DRAWINGS

The present invention is best understood with reference to the accompanying drawings in which like numerals preferred to like elements and in which.

DETAILED DESCRIPTION OF A EXEMPLARY EMBODIMENT

The present induction well logging tool, is useful during monitoring while drilling, logging while drilling and wireline applications. The present example comprises a primary magnetic field transmitter, a receiver of the magnetic field induced by eddy currents in the investigated formation, a data acquisition and a control system to manage the inductive logging tool's electronics operations, and to collect and process data. A transmitter incorporates an oscillator, a power amplifier driven by the oscillator and a transmitting antenna. The receiver electronics comprises an induction antenna and input amplifier connected in series. Such downhole tool applications employ induction coils for both receiver and transmitter antennas.

The instrument structure provided by the present invention enables increased stability and accuracy in an induction wellbore logging tool and its operational capabilities, which, in turn, results in better quality and utility of wellbore data acquired during logging. The features of the present invention are applicable to improve the structure of a majority of known induction tools, those for example, designed and developed by Baker Atlas of Houston, Tex. These induction tools include Baker Atlas induction tool model numbers 1507, 1515 and 1520.

Figure 1:
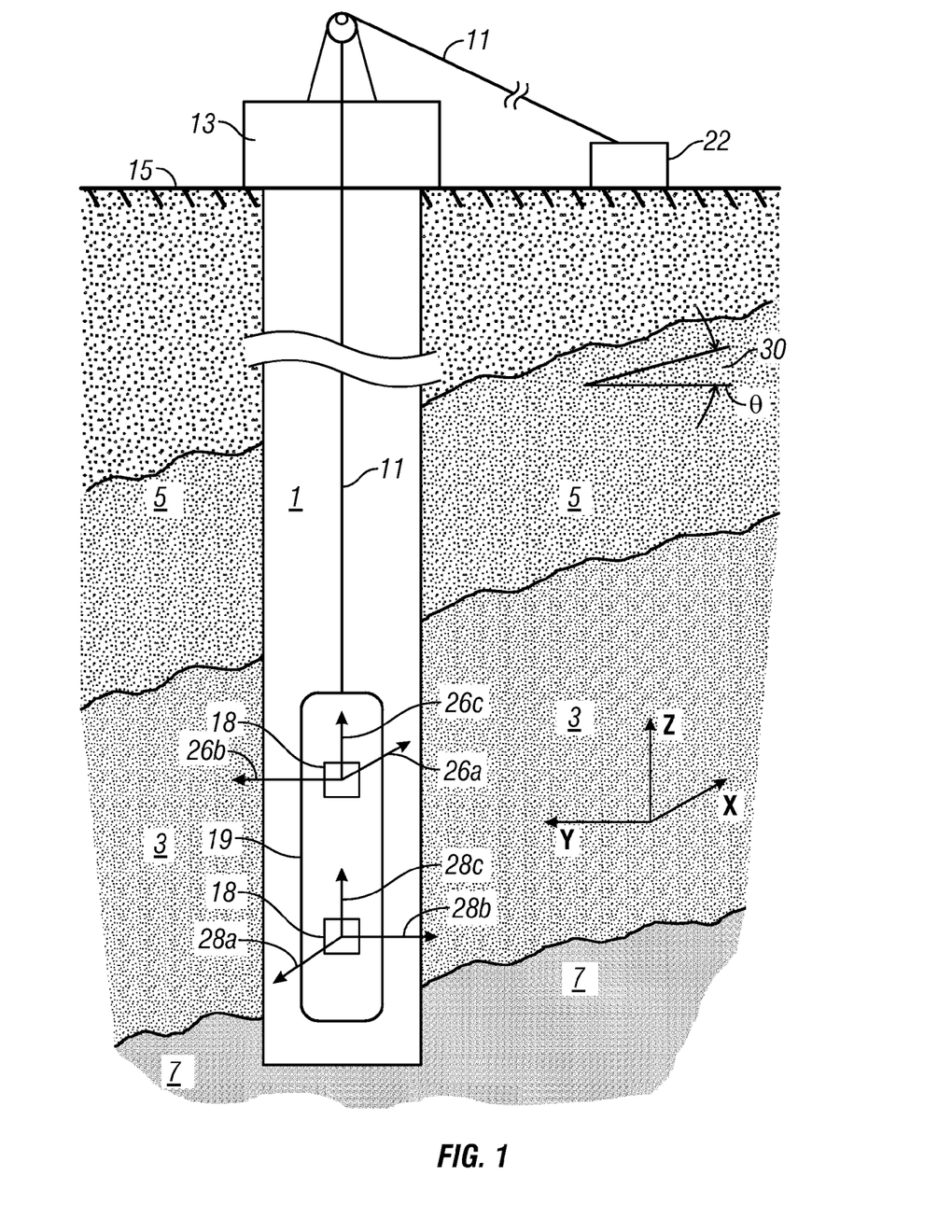
FIG. 1 shows schematically a wellbore extending into a laminated earth formation, into which wellbore an induction logging tool as used according to the invention has been lowered.

The invention will now be described in more detail and by way of example with reference to the accompanying drawings. FIG. 1 schematically shows a wellbore 1 extending into a laminated earth formation, into which wellbore an induction logging tool as used according to the present invention has been lowered. The wellbore in FIG. 1 extends into an earth formation which includes a hydrocarbon-bearing sand layer 3 located between an upper shale layer 5 and a higher conductivity than the hydrocarbon bearing sand layer 3. An induction logging tool 9 used in the practice of the invention has been lowered into the wellbore 1 via a wire line 11 extending through a blowout preventor 13 (shown schematically) located at the earth surface 15. The surface equipment 22 includes an electric power supply to provide electric power to the set of coils 18 and a signal processor to receive and process electric signals from the receiver coils 19. Alternatively, the power supply and/or transmitter signal drivers and receiver processors are located in the logging tool.

The relative orientation of the wellbore 1 and the logging tool 9 with respect to the layers 3, 5, 7 is determined by two angles, one of which angle θ 30 as shown in the FIG. 1. For determination of these angles, see, for example U.S. Pat. No. 5,999,883 by Gupta, et al. The logging tool 9 is provided with a set of transmitter coils 18 and a set of receiver coils 19, each set of coils 18, 19 being connected to surface equipment 22 via suitable conductors (not shown) extending along the wire line 11.

Each set of coils 18 and 19 includes three coils (not shown), which are arranged such that the set has three magnetic dipole moments in mutually orthogonal directions, that is, in x, y and z directions. The three-coil transmitter coil set transmits $T_X$, $T_Y$ and $T_Z$. The receiver coil receives $R_X$, $R_Y$ and $R_Z$ plus the cross components, $R_{XY}$, $R_{XZ}$ and $R_{ZY}$. Thus, transmitter coil set 18 has magnetic dipole moments 26a, 26b, 26c, and receiver coil set 19 has magnetic dipole moments 28a, 28b, 28c.

Having or not having electrical isolation of the transmitter coil set 18 from receiver coil set 19 has been a choice of a particular tool design. In one embodiment the transmitter coil set 18 is electrically isolated from the receiver coil set 19. In an alternative embodiment, each coil in transmitter coil set 18 electrically isolated from each other and each coil in receiver coil set 19 electrically isolated from each other. The coils with magnetic dipole moments 26a and 28a are transverse coils, that is, they are oriented so that the magnetic dipole moments are oriented perpendicular to the wellbore axis, whereby the direction of magnetic dipole moment 28a is at 90 degree of the direction of magnetic dipole moment 26a. Furthermore the sets of coils 18 and 19 are positioned substantially along the longitudinal axis of the logging tool 9.

Figure 2:
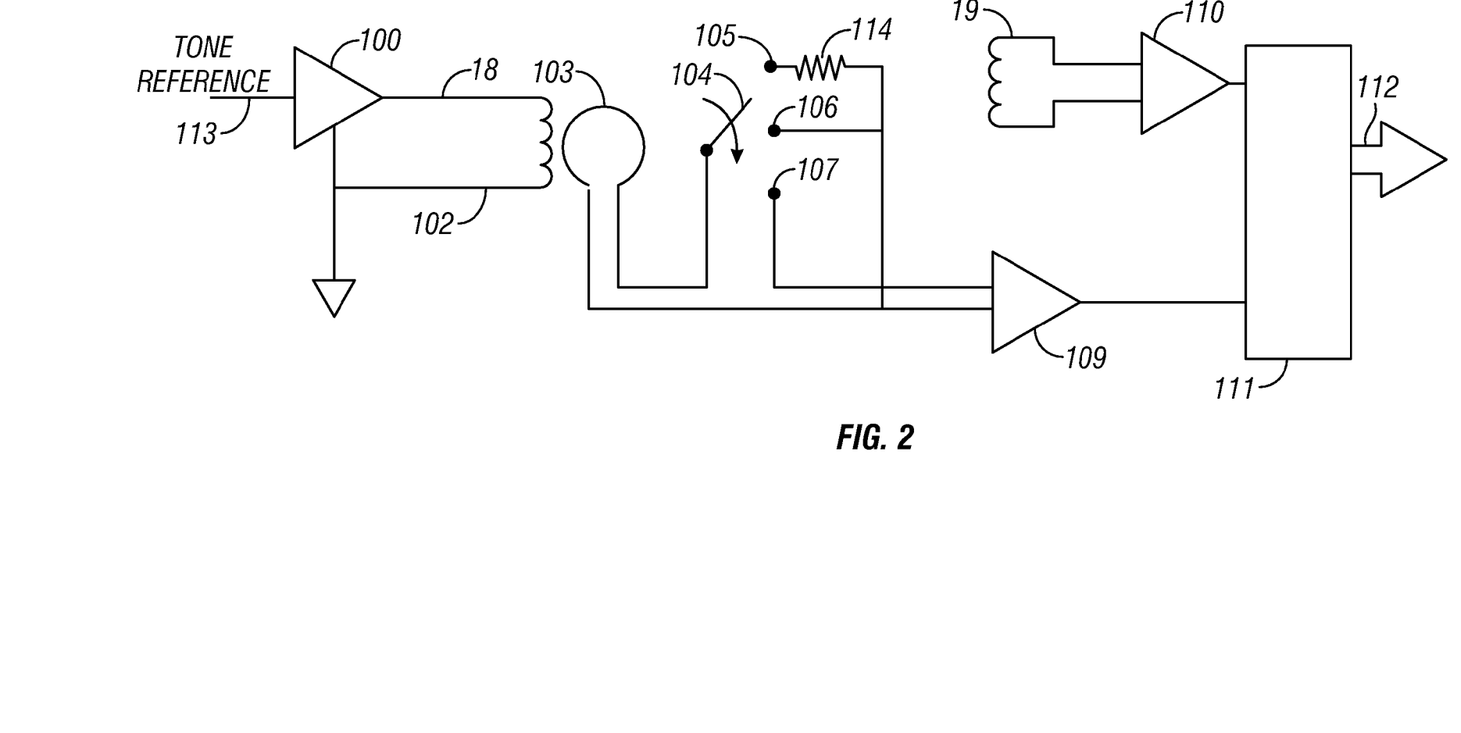
FIG. 2 is schematic representation of a preferred sensor stability verification loop is illustrated.

Turning now to FIG. 2, a schematic representation of a exemplary sensor stability verification loop is illustrated. As shown in FIG. 2, power amplifier 100 accepts a verification tone reference signal 113 as input to the transmitter coil set 18 (coil set 18 comprising x, y and z-axis coils shown having magnetic dipole moments 26a, 26b and 26c as shown in FIG. 1).

When the switch 104 is in a first position and connected to node 107, the reference loop 103 senses the transmitted field from transmitter coil set and sends the received signal to the transmitter reference channel 109 having high input impedance so there is no electrical current flowing through the loop 103. To provide for sufficient high impedance in the frequency range of operations of the induction tools the input stages in the reference channel 109 could be built based on CMOS technology.

Thus, in the first position of the switch 104 the loop 103 acts as an induction receiver that signal through reference channel 109 sent to processor 111 and subsequently sent to surface via telemetry 112. During logging, the reference signal is recorded to track changes in the transmitter current enabling subsequent removal of the effects of changes in the transmitter current on the received signal during logging.

In a third position, switch 104 connects with node 105 wherein the loop 103 signal applies to the element 114 having a variable phase shifting impedance. Having this element 114 connected in parallel with loop 103 allows for appearance of electrical current driven by the voltage induced in the loop 103 by the transmitter magnetic field. In turn, the magnetic field of this current induced in the loop 103 couples into the receiver coil set 19 thus creating control signals in receivers (coil set 19 comprising x, y and z-axis coils shown having magnetic dipole moments 28a, 28b and 28c as shown in FIG. 1).

Element 114 can be selected to induce a desired phase angle shift into the receiver voltage in order to measure both quadrature and real component of the control signal where phase reference is with respect to the transmitter magnetic field. In a second position, switch 104 is connected without the loss element, thus there is no loss so that the lossy and non-lossy signals can be compared. In this position the structure enables collection of quadrature sensor stability verification data only for comparison to the quadrature component of the logging data. The quadrature data is significant because it could be less affected by the borehole effects. Thus the quadrature verification signal can be used to remove errors and effects in the quadrature signal to enable more accuracy in the in-phase and out of phase data acquired during logging. The phase shifting device may be made of a discrete electronic component, a transmission line, an electromagnetic field absorbing material and/or a Faraday phase shifter.

Preferably, the reference loop 103 preferably should be well coupled magnetically to the respective transmitter coils to provide for a large induced signal. Simultaneously, the leakage inductance of the transmitter coil $L_T$ 18 is preferably much larger than the leakage inductance of the loop 103—$L_L$. These configurations result in the mutual inductance M between these two coils being negligible compared to $L_T$ itself. Thus, in an exemplary embodiment the leakage inductance of the transverse coil $L_T \approx 200$ μH while the reference loop 103 inductance $L_L \approx 0.5$ μH and M≈6 μH. With these parameters the voltage induced in the reference loop 103 would be in $\sqrt{(L_T/M)}$ times lower than the voltage applied to the transmitter coil.

Loading the reference would also change the effective impedance imposed on the transmitter driving electronics and, in turn, vary the transmitter coil current. However, with the above-mentioned electrical parameters the changes in the overall transmitter impedance would not exceed 3% even maximum load is applied (switch 104 in the second position). Moreover, because these variations in the transmitter current have been thoroughly verified throughout the tool design stage, they could be accurately accounted for in operation.

The circuitry of FIG. 2 with switch 104 connected to node 107 is used for measuring the transmitter's magnetic field for calibrating the receiver input signal conditions circuitry in the "calibration" mode and for controlling the primary field during logging. In the circuitry of FIG. 2, the transmitter field is measured by acquiring the voltage or "reference signal" induced across the low impedance loop 103 closely coupled magnetically to the induction transmitter. To avoid any electrical current from flowing in the reference circuit and distorting overall magnetic field distribution, the voltage is acquired without loading the loop. By following this condition the induced voltage contains information regarding the shape of the transmitter field and is continuously recorded.

Figure 3:
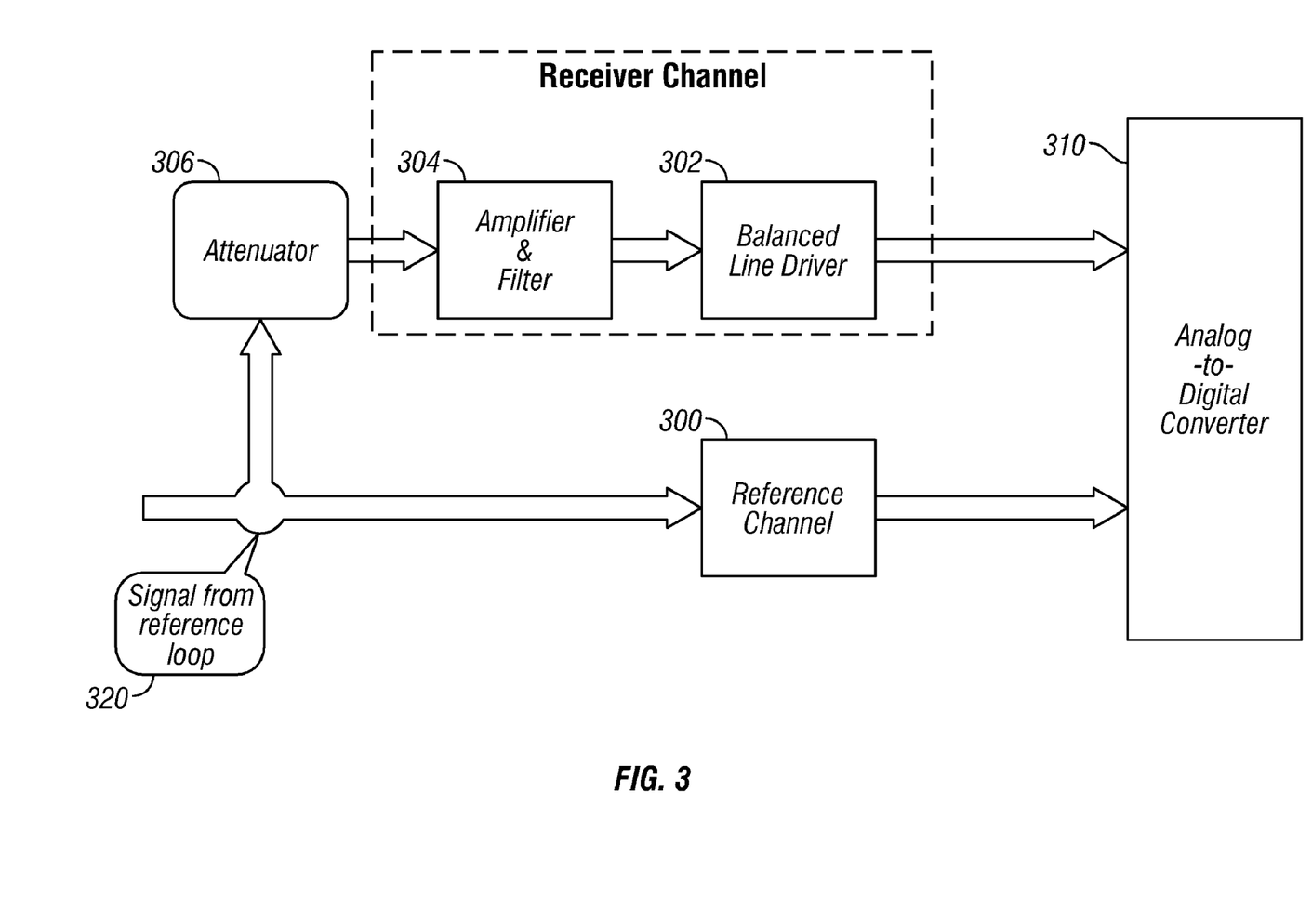
FIG. 3 is an example of a calibration mode.

Turning now to FIG. 3 the signal from the reference loop 320 is input to the reference channel 300 and the attenuator 306. The reference channel outputs the signal to analog to digital converter 310. The attenuator 306 outputs the signal to the receiver channel comprising the amplifier and filter 304 which outputs the signal to the balanced line driver 302. The balanced line driver 302 outputs the signal to the analog to digital converter 310. Thus, in the "cal" mode, as shown in FIG. 3, the receiver coils are disconnected from the input of respective pre-amplifier and instead the reference voltage is measured allowing for accounting of amplitude-phase responses of the input conditioning circuits. This operation is performed prior to the start of logging and can be repeated by a field engineer depending on the well conditions and temperature.

Figure 4:
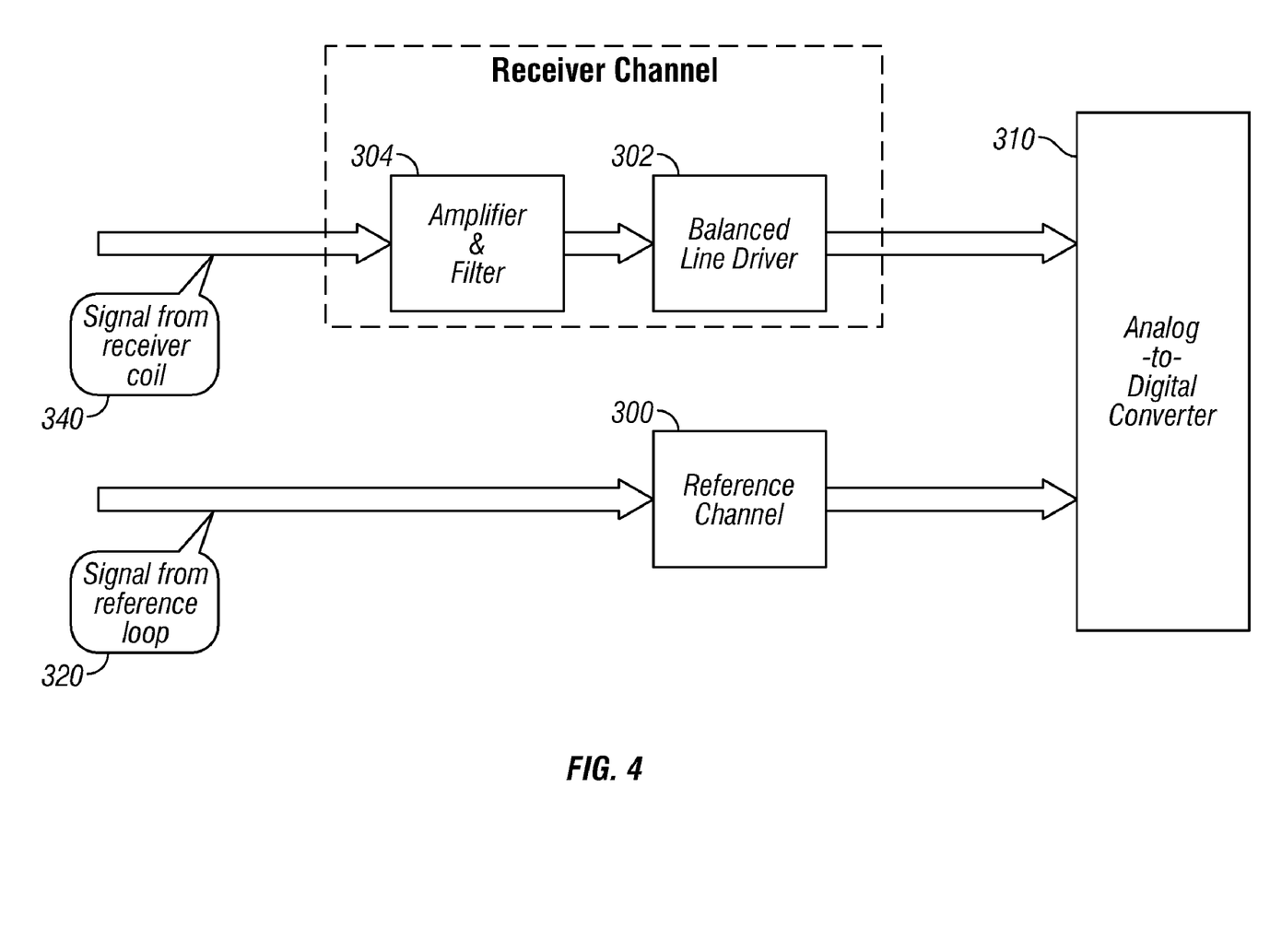
FIG. 4 is an example of a logging mode.

Turning now to FIG. 4 the signal from the reference loop 320 is input to the reference channel 300. The reference channel outputs the signal to analog to digital converter 310. The signal from the receiver coil 340 is output to the receiver channel comprising the amplifier and filter 304 which outputs the signal to the balanced line driver 302. The balanced line driver 302 outputs the signal to the analog to digital converter 310. Continuously recording the reference voltage is also used for normalization of the receiver signal in the "Log" mode, as shown in FIG. 4, when connections between receiver coils and their associated amplifiers have been restored. This normalization results in correct estimation of the formation apparent resistivity and helps in accounting of any imperfections or changes in the primary field.

The above use of the reference signal has limitations as it relies on stability of the receiver coils, or at least, knowledge of these coils behavior. Thus, in the "Log" mode coils are disconnected from pre-amplifiers. The experience of employing induction tools in the field demonstrates that this assumption is correct in many cases; however, there are a number of occasions where coil performance becomes in doubt. The present invention enables a simplified and quick implementations of the modified "cal" (calibration) mode that does not require significant hardware modification and enables a field engineer to verify the coils performance circuit prior to lowering the induction logging tool into the well without disconnecting from the signal conditioning circuitry. A good measure of the performance of an antenna is stability of its transfer function. The transfer function is, in the frequency domain, the ratio of the antenna output to its input in the frequency domain.

Figure 5:
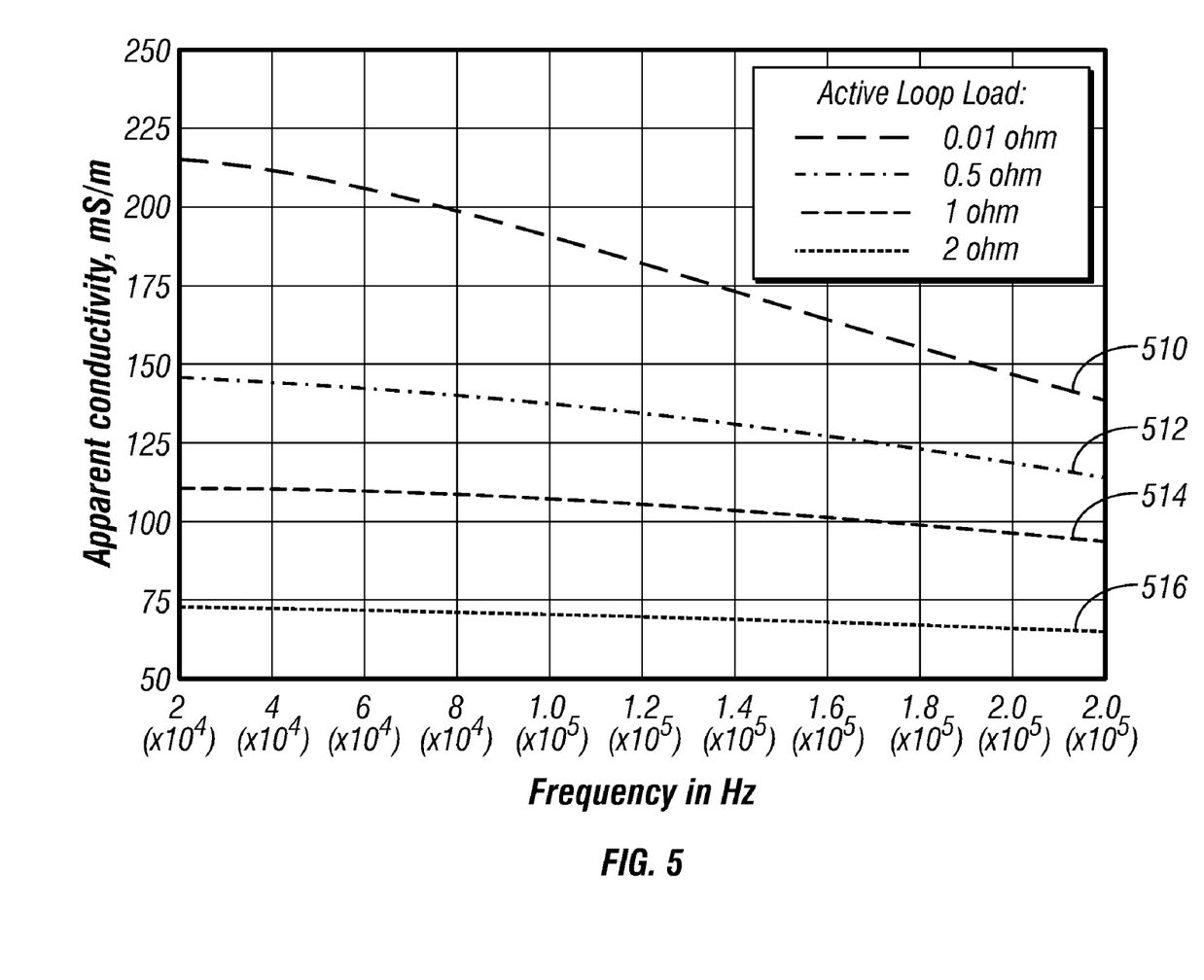
FIG. 5 is a modeling of the present invention.
Figure 6:
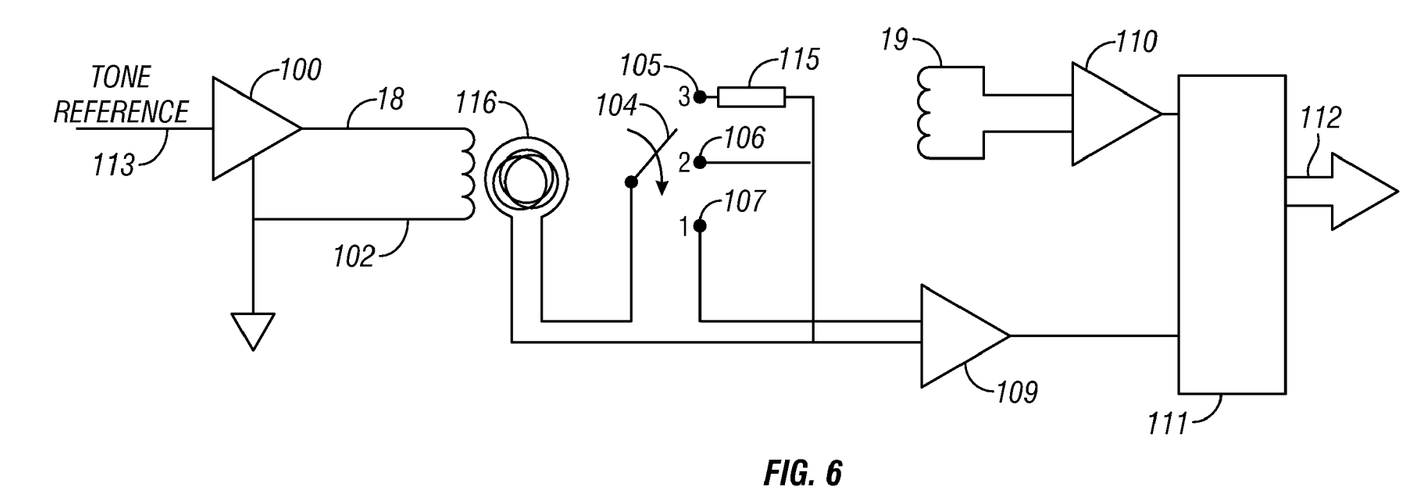
FIG. 6 is an example of the active load provided in the example of the present invention.

Turning now to FIG. 6, in an exemplary embodiment, the reference loop circuitry of FIG. 6 or an additional reference loop is placed on the mandrel and closely coupled magnetically to the transmitter 18. During the calibration "cal" mode the reference loop 103 is connected to a pre-determined load 115 when switch 104 is in position 3. In the present example the reference loop is connected to an active load. The pre-determined load creates an inducted current in the "loop-load" network 19. The inducted current generates a secondary magnetic field fully correlated fully correlated with the transmitter and offset tool readings. A modeling example of the calibration mode is illustrated in FIG. 5 for active loop loads of 0.01 ohm 510, 0.5 ohm 512, 1 ohm 514 and 2 ohms 516. Consistency of these readings taken during manufacturing stage, pre-log calibration and verification is indicative of the entire tool's receiver module stability. It should be noted that the term "switch" is intended to mean "a device for making, breaking, or changing connections in an electric circuit."

Two additional functions are provided in order to reduce the adverse effects of using the present invention inside of a well and in those situations wherein logging is performed in conductive formation and/or conductive mud. The signal induced into the receiver coil from the surrounding environment while in these logging conditions can be significant. First an additional reference loop 116 is provided with a large number of turns to enable operation with large induced currents.

Figure 7:
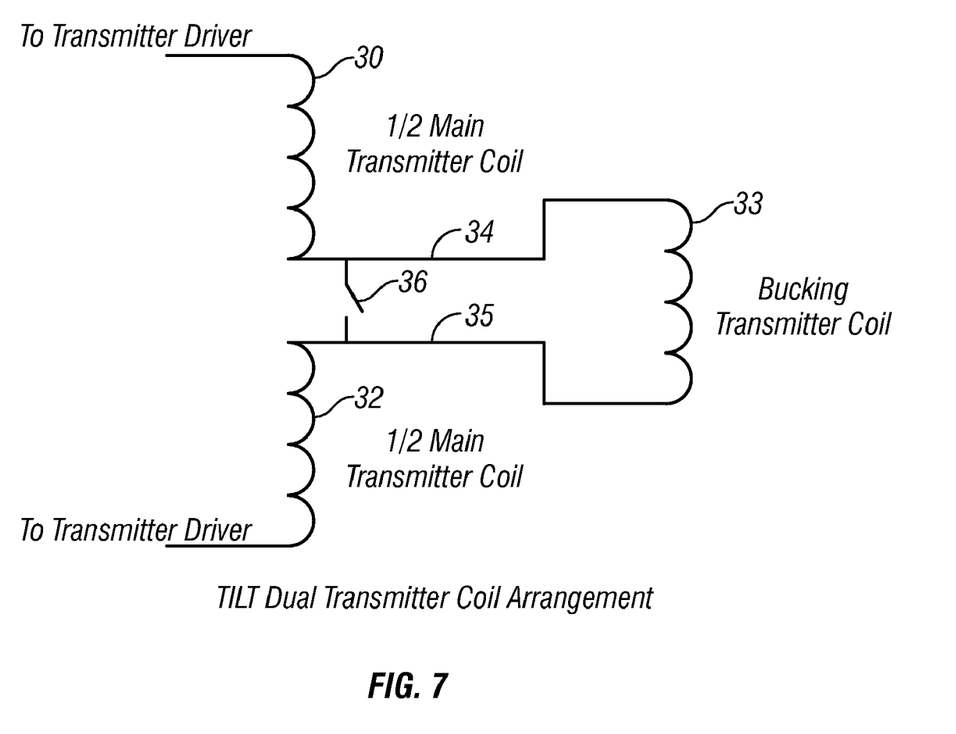
FIG. 7 illustrates a split transmitter coil arrangement with a bucking coil.

Turning now to FIG. 7, a split transmitter coil having section 30 and section 32 has a bucking coil 33 interposed between the two sections and spaced apart from the mail transmitter coil along the mandrel. A switch 34 when closed shuts down any field generated by the bucking coil 33. Shutting down the magnetic filed irradiated by a transmitter bucking coil enables the above-explained "modified" calibration mode in adverse conditions of conductive mud. In each of these cases, to have a reliable tool design an individual tool transmitter should generate a magnetic flux in an area of the receiver coil or coils that typically is an order of magnitude larger than the maximum response expected from the formation. Specifically, the magnetic field generated by the field generating mechanism has a ratio to an expected maximum response from the formation that is determined by a preselected accuracy. Thus, using a properly loaded coil with a large number of turns or disconnecting the bucking transmitter facilitates a relatively large signal in the receiver coil and thus use it for verification.

The foregoing example is not intended to limit the scope of the invention which is defined by the following claims.

What is claimed is:

1. An apparatus for sensing antenna performance in an induction logging tool having a transmitter and a receiver in the induction logging tool, the apparatus comprising:
    a magnetic field generating mechanism including a bucking coil configured to be coupled to the transmitter, and to the receiver through a switch, and
    a processor configured to process a signal from the receiver and sense antenna performance in the induction logging tool.

2. The apparatus of claim 1 wherein the bucking coil is configured to be energized by a current from the transmitter flowing through the switch.

3. The apparatus of claim 1, wherein the magnetic field generating mechanism further comprises a reference loop magnetically coupled to the transmitter wherein within the reference loop, currents produce a magnetic field.

4. The apparatus of claim 3, wherein the reference loop further comprises a load.

5. The apparatus of claim 4, wherein the load further comprises a phase shifting load.

6. The apparatus of claim 5, wherein the phase shifting load further is constructed from at least one of (i) a discrete electronic component, (ii) a transmission line, (iii) an electromagnetic field absorbing materials, and (iv) a Faraday phase shifter.

7. The apparatus of claim 1 wherein the magnetic field generated by the magnetic field generating mechanism is different in at least one of (i) an amplitude, and (ii) a phase from a response from a formation.

8. The apparatus of claim 1, wherein the magnetic field generated by the magnetic field generating mechanism has a ratio to an expected maximum response from a formation determined by a preselected accuracy.

9. The apparatus of claim 1 further comprising a conveyance device configured to convey the logging downhole, the conveyance device selected from (i) a wireline, and (ii) a drilling tubular.

10. A method of sensing antenna performance in an induction logging tool comprising:
    deploying an induction logging tool including a transmitter and a receiver in a bore hole;
    electromagnetically coupling a magnetic field generating mechanism to the transmitter;
    coupling a bucking coil in the field generating mechanism through a switch to the receiver;
    using the field generating mechanism to provide a first signal upon activation of the transmitter and a second signal in the receiver; and
    using the first signal and the second signal for sensing antenna performance.

11. The method of claim 10 further comprising loading a reference loop of the field generating mechanism with an active load.

12. The method of claim 10 further comprising creating an induced current in a loop load network.

13. The method of claim 10 further comprising inducing a magnetic field having an order of magnitude greater than an expected maximum response from a formation in a receiver loop.

* * * * *